United States Patent Office

2,723,917
Patented Nov. 15, 1955

2,723,917

MANUFACTURE OF ULTRAMARINE

Robert Bruce Van Order, Berkeley Heights, and Richard Franklin Reeves, Somerville, N. J., assignors to American Cyanamid Company, New York, N. Y., a corporation of Maine No Drawing. Application May 19, 1953,
Serial No. 356,110

2 Claims. (Cl. 106—305)

This invention relates to the manufacture of ultramarine and more particularly to an improved process of converting primary ultramarine into secondary ultramarine.

Ultramarine is produced in two steps, the first of which involves high temperature heating of the charge, which is a mixture of aluminium silicates, sulfur, reducing agent and alkali such as sodium carbonate. In the first step, oxidizing and other reactive gases such as acid gases must be kept from the charge. The resulting product known as primary ultramarine, must then be cautiously oxidized to produce the strong blue pigment of commerce, which is referred to as secondary ultramarine and, for the best product, oxidation is normally effected at considerably lower temperatures than those required for the production of primary ultramarine.

For about a century after the synthetic ultramarine process had been developed, the two steps were effected in crucibles of controlled porosity. These crucibles, which are about 9 inches in diameter, serve two important functions. First, they sub-divide the ultramarine charge into small uniform portions so that it is possible to transmit heat as rapidly and uniformly as possible into the center of the portions, and secondly, they keep excessive amounts of deleterious gases away from the charge, both during the first step of forming primary ultramarine and in the second step of oxidation or conversion to secondary ultramarine.

In the crucible process, the time cycle is very long. Even with the best improvements which have been developed, it still takes about two weeks. The reason for this is that the heating step takes from 1½ to 2 days because of the slow conduction of heat into the center of the crucibles and the conversion step takes a long time because the volume of oxidizing gas passing through the pores of the crucible is maintained at a very low figure. These pores have to be very small, for otherwise serious overoxidiation of the outer layers of the crucible charge is likely to occur, which would destroy the product for pigment purposes, transforming it into a dirty bluish-gray or white material.

In addition to the long time cycle required in the crucible process, the quality of the product has never been uniform even in a single crucible, much less in a furnace batch. Since the conversion step involves the slow diffusion of oxygen or oxidizing gases through the pores of the crucible, it is impossible to effect the necessary control with the result that overoxidation occurs in the outer layers of the crucible charge, underoxidation occurs in the center, and in between there is an annulus of reasonably high grade ultramarine. These effects are also obtained even when the necessary control of flow of gases occurs, if the crucibles are not uniform themselves from the standpoint of porosity. The production of a certain proportion of low grade material reduces the yield in a given furnace and further adds to the cost. Also, the impossibility of exact control results in a variation, from batch to batch, in the shade and strength of the ultramarine produced. This necessitates the use of large storage facilities and large inventories of pigment which adds greatly to the cost of manufacture and to the efficiency of operation.

In recent years, a greatly improved ultramarine process has been developed which includes three features. The first is the use of sulfur dioxide in the conversion step. This compound oxidizes primary ultramarine to secondary ultramarine, but it does not have a sufficiently high oxidation potential to overoxidize the material. This feature is described and claimed in the Beardsley et al. patent, No. 2,441,951. The second feature is the use of a briquetted ultramarine mix instead of a loose mix. This feature is described and claimed in the Beardsley et al. patent, No. 2,441,950. The third feature is a two-step process in which the firing step is carried out in completely impervious crucibles which do not permit any gases to enter the charge, and the second or oxidation step is effected in a suitably enclosed container by means of sulfur dioxide. This feature is described and claimed in the Beardsley et al. patent, No. 2,441,952.

The improvements developed by Beardsley et al. permit very marked savings in commercial manufacture. The cycle can be shortened if a two-step process is used with sulfur dioxide, the time being reducible to the order of a week or less. There is no overoxidized or underoxidized secondary ultramarine, and the quality of the product can be maintained uniform.

In spite of the many advantages possessed by the above-described process, the use of sulfur dioxide in the oxidation step is not without certain disadvantages. When primary ultramarine is formed, the mix contains an excess of sulfur, approximately twice as much sulfur as appears in the final p:gment. All of this excess sulfur is lost in the old crucible process because part of it is driven off in the firing stage and the remainder is oxidized in the second stage. When sulfur dioxide is used as the oxidizing agent, it is theoretrically possible to recover this additional sulfur as elemental sulfur. However, engineering factors have made this recovery difficult and in some cases impracticable because there can never be complete usage of all the sulfur dioxide regardless of the equipment involved and a large volume necessarily escapes to the atmosphere. This involves the loss of a definite quantity of sulfur in the form of sulfur dioxide which cannot be tolerated in the present-day shortages of sulfur.

Also, in acting as an oxidizing agent sulfur dioxide itself is reduced to elemental sulfur which effects an increase in the amount of elemental sulfur that is evolved during the oxidation to three times the normal amount. This creates an engineering problem in that there are greater losses due to the fact that the sulfur is only partially recovered when such quantities are involved and the fact that the stream of oxidizing gases carries so much sulfur that it is necessary to install expensive equipment to maintain the sulfur in the gas stream and not allow it to precipitate out thereby plugging the lines carrying the oxidizing gases.

Another disadvantage of the use of sulfur dioxide is the fact that the charge of primary ultramarine has to be heated by external means in order to effect a desirable rate of oxidation for commercial considerations. This adds to the cost of operation. The reason for the requirement of some means of external heat in the use of sulfur dioxide stems from the relatively small quantity of heat evolved per unit weight of primary ultramarine oxidized.

Another disadvantage in the use of sulfur dioxide results from the high sulfur content of the oxidizing gases. As a result, the final pigment at the end of oxidizing contains a high content of free sulfur unless special and expensive techniques are devised to eliminate it.

In accordance with the present invention, we have discovered that the use of a mixture of air and water vapor as an oxidizing gas in the oxidation of primary ultramarine to secondary ultramarine possesses none of the disadvantages found to result when sulfur dioxide is used. When air and water vapor is used there is no concern when an excess of oxidizing agent occurs because there is no critically short or costly material and only insignificant quantities of sulfur being evolved to the atmosphere as in the case of sulfur dioxide. When an excess of sulfur dioxide is used, the excess is lost to the atmosphere which means a loss of the critically short material sulfur in the form of sulfur dioxide. When an excess of air and water vapor is used, the loss of the excess is insignificant.

It is an advantage of the present invention that the preparation of air and water vapor as an oxidizing gas is extremely simple. For example, any composition can be generated simply by blowing a stream of air through water maintained at a definite temperature. Regardless of what volume of air is bubbled through the water, the exit gas will always be of the same composition when the temperature of the water is maintained constant. This can easily be accomplished by using any of the known automatic temperature regulators. In the preparation of sulfur dioxide, on the other hand, only one composition, namely, 20% $SO_2$, 80% $N_2$, is possible without resorting to complicated and costly equipment for increasing the sulfur dioxide content. Even the preparation of the 20% $SO_2$, 80% $N_2$, mixture involves the use of considerable equipment, the operation of which requires considerable attention and maintenance, all adding up to an increased cost of operation.

It is a further advantage of the present invention that the use of air and water vapor yields a product which is practically free of elemental sulfur whereas, as stated hereinbefore, special techniques have to be devised to eliminate a high content of free sulfur from the product when sulfur dioxide is used. Moreover, in the use of air and water vapor, elemental sulfur is evolved but only to the extent of about ⅓ the quantity that is evolved in the case of sulfur dioxide. This sulfur may be collected by means of inexpensive sulfur condensers.

It has also been found that the presence of water vapor has still another desirable effect. Ultramarine blue is in great demand because of its brilliance of color. It is known that when ultramarine is steamed or cooled to a low temperature (under 100° C.) with steam, its brilliance is increased considerably, thus enhancing its value. The same effect is obtained by the presence of the water vapor in the oxidizing gas, thereby obviating the necessity of a separate steaming operation subsequent to the oxidation step.

It is a surprising feature of the present invention that a mixture of air and water vapor can be used as an oxidizing gas instead of air alone. Water vapor is ordinarily not considered to be an oxidizing agent and, moreover, its presence in the oxidizing gas has heretofore been considered to have a deleterious effect. (See Beardsley et al. patent, No. 2,441,951.)

In accordance with the present invention, however, we have found that water vapor does act as an oxidizer by a reaction involving in the over-all the transformation of a small fraction of the water vapor into hydrogen sulfide and oxygen. While this is the end result it is probable that free oxygen is not formed at any time and that the oxidizing effect takes place through a more complicated chain of reactions. This, however, is not the only effect of the water vapor. Its presence alters the oxidation potential of oxygen so that complete oxidation of primary ultramarine to secondary ultramarine is effected, but no matter how much of the mixture of air and water vapor is present it does not have sufficiently high oxidation potential to overoxidize the secondary ultramarine to the white or gray product which results from overoxidation in the presence of oxygen (air) alone.

Moreover, by the use of a mixture of air and water vapor, it is possible to carry out the oxidation step without any careful control of the amount of air and water vapor. Also, since it is not necessary to restrict the amount of air and water vapor, the two-step process described in the Beardsley et al. patent, No. 2,441,952, may be carried out without the use of containers of controlled porosity in the second step. Thus, according to the present invention ultramarine can be treated in bulk and a large area of surface contacted with air and water vapor without any danger of overoxidation. This permits a drastic reduction of the time required in the second or oxidation step, which reduces the fixed cost of the process because of greatly increased output per unit volume of equipment.

The use of air and water vapor as an oxidizing agent has been found to result in much more uniformity of product than that produced with the use of sulfur dioxide. The reason for this is not clear although it may be a result of the increased range of temperatures that can be employed with air and water vapor. Sulfur dioxide requires temperatures of 200° C. to 550° C., the preferred temperature being about 400–466° C. With air and water vapor as the oxidizing gas, on the other hand, we have found that a temperature of about 100° C. to about 550° C. can be employed with no sacrifice of time or quality. We prefer to use a temperature of 250–300° C. for smoothness of operation, however.

The composition of the air and water vapor used as the oxidizing agent may be varied over a wide range. Thus, mixture containing from 10% to 75% of water vapor by volume have been satisfactorily used. We prefer, however, to use mixtures in the lower range of water vapor content because in the higher ranges there appears to be a reduction in quality of the pigment. Thus, when the water vapor content is much in excess of 75% there is a reduction in tinting strength of the pigment of from 10% to 15%. Therefore, we prefer to operate in the lower ranges of water vapor content, that is, from about 10% to about 20% of water vapor by volume because at this range the tinting strength of the pigment is not adversely affected. The various compositions contemplated herein can be obtained by the aforementioned method of bubbling air through water at a definite temperature or the metering of air and steam prior to mixing.

It is an advantage of the present invention that no change in equipment, or alteration of other steps in the manufacture of ultramarine blue need be made. Moreover, no change in the nature of the ultramarine mix is required. In other words, the present invention requires no different raw materials than those which are customarily used. Naturally, of course, it is desirable to use ultramarine mixes which give the best products. For example, while the process can be used with mixes that produce low sulfur ultramarines, normally the modern high sulfur ultramarine will be produced because of its superior quality and tinctorial strength.

The invention will be described in greater detail in conjunction with the following specific examples in which the parts are by weight unless otherwise specified.

*Example 1*

A mix was made of the following composition:

| | Parts |
|---|---|
| China clay | 822 |
| Diatomite | 112 |
| Soda ash | 743 |
| Sulfur | 665 |
| Rosin | 60 |

The mix was ground for four hours in a pebble mill loaded with pebbles of about ¾ inch diameter. The ground mix was formed into briquets cold by pressure as described in Patent No. 2,441,950. The briquets were loaded into fused silica containers. The containers were heated to a temperature of about 720–760° C. during a period of 6 hours and held there for 4 to 5 hours. The containers were cooled, the briquets removed and cracked into smaller pieces and the pieces loaded into a fused silica container fitted for the passage of gas through it. While the container was being heated to about 100° C., a mixture of 10% water vapor and 90% air, made by bubbling air through water maintained at 46° C. was passed through the charge. The gas mixture was passed through at a rate of 485 cc. per minute for 4 hours after the temperature had reached 100° C. The temperature during the passage of air and water vapor rose as high as 155° C. During oxidation, elemental sulfur was evolved and carried away in the stream of residual nitrogen gas and water vapor left after the oxygen had been consumed by the primary ultramarine. The exit gas contained also traces of hydrogen sulfide and sulfur dioxide. After cooling down in a stream of the same gas mixture, the charge was washed, ground wet in a pebble mill loaded with pebbles of ¼ to ⅜ inch size and dried.

*Example 2*

Following the procedure of Example 1, primary ultramarine made as in Example 1, was oxidized at 300° C. with a mixture of 10% water vapor and 90% air made as in the preceding example. The gas mixture was passed through at a rate of 485 cc. per minute during heating up to 300° C. and for 4 hours after the temperature had reached 300° C. The temperature during the passage of air and water vapor rose as high as 385° C. During oxidation, elemental sulfur was evolved and carried away in the stream of residual nitrogen gas and water vapor left after the oxygen had been consumed by the primary ultramarine. The exit gas contained traces of hydrogen sulfide and sulfur dioxide. After cooling down in the presence of the same gas mixture, the charge was washed, ground wet in a pebble mill loaded with pebbles of ¼ to ⅜ inch size and dried.

*Example 3*

Following the procedure of Example 1, primary ultramarine, made as in Example 1, was oxidized at 500° C. with a mixture of 10% water vapor and 90% air made as in Example 1. The gas mixture was passed through at a rate of 485 cc. per minute during heating up to 500° C. and for 4 hours after the temperature had reached 500° C. The temperature during the passage of air and water vapor rose as high as 535° C. During oxidation, elemental sulfur was evolved and carried away in the stream of residual nitrogen gas and water vapor left after the oxygen had been consumed by the primary ultramarine. The exit gas contained also traces of hydrogen sulfide and sulfur dioxide. After cooling down in the presence of the same gas mixture, the charge was washed, ground wet in a pebble mill loaded with pebbles of ¼ to ⅜ inch size and dried.

*Example 4*

Following the procedure of Example 1, primary ultramarine made as in Example 1, was oxidized at 200° C. with a mixture of 50% water vapor and 50% air made by bubbling air through water maintained at 82° C. The gas mixture was passed through at a rate of 485 cc. per minute during heating up to 200° C. and for 4 hours after the temperature had reached 200° C. The temperature during the passage of air and water vapor rose as high as 245° C. During oxidation, elemental sulfur was evolved and carried away in the stream of residual nitrogen gas and water vapor left after the oxygen had been consumed by the primary ultramarine. The exit gas contained also traces of hydrogen sulfide and sulfur dioxide. After cooling down in the presence of the same gas mixture, the charge was washed, ground wet in a pebble mill loaded with pebbles of ¼ to ⅜ inch size and dried.

*Example 5*

Following the procedure of Example 1, primary ultramarine made as in Example 1, was oxidized at 300° C. with a mixture of 75% water vapor and 25% air made by bubbling air through water maintained at 92.2° C. The gas mixture was passed through at a rate of 485 cc. per minute during heating up to 300° C. and for 4 hours after the temperature had reached 300° C. The temperature during the passage of air and water vapor rose as high as 380° C. During oxidation, elemental sulfur was evolved and carried away in the stream of residual nitrogen gas and water vapor left after the oxygen had been consumed by the primary ultramarine. The exit gas contained also traces of hydrogen sulfide and sulfur dioxide. After cooling down in the presence of the same gas mixture the charge was washed, ground wet in a pebble mill loaded with pebbles of ¼ to ⅜ inch size and dried.

We claim:

1. The process of producing secondary ultramarine from primary ultramarine which comprises contacting the primary ultramarine at a temperature of about 100° C. to about 550° C. with a gaseous mixture of air and water vapor containing from about 10% to about 75% water vapor by volume.

2. The process according to claim 1 wherein the air and water vapor mixture contains from about 10% to about 20% water vapor by volume.

No references cited.